Figure 1:
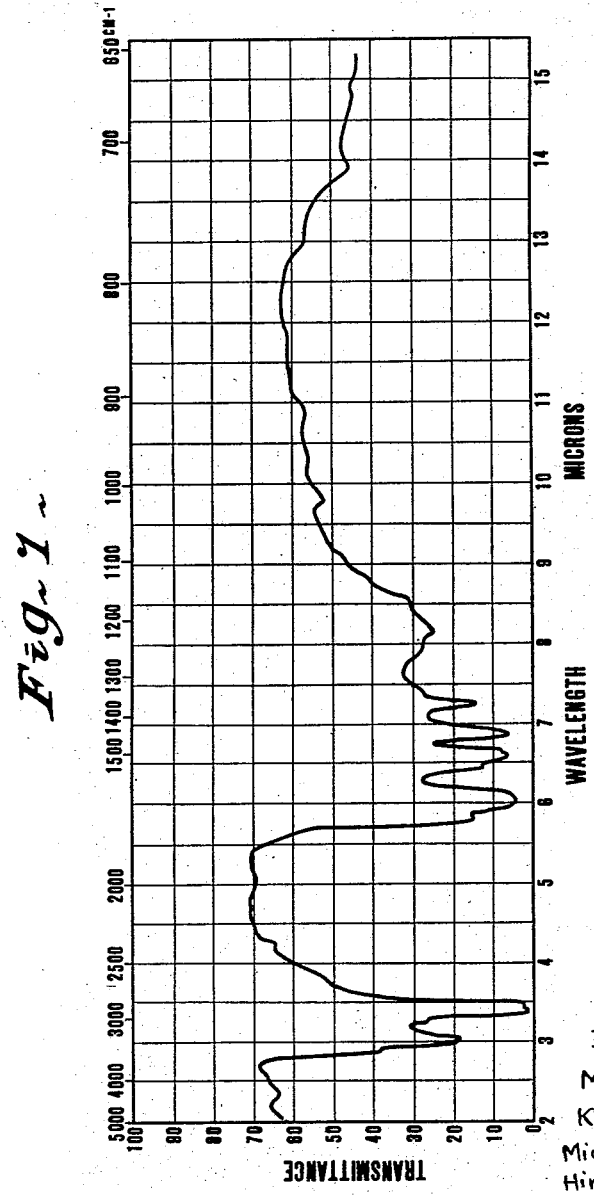

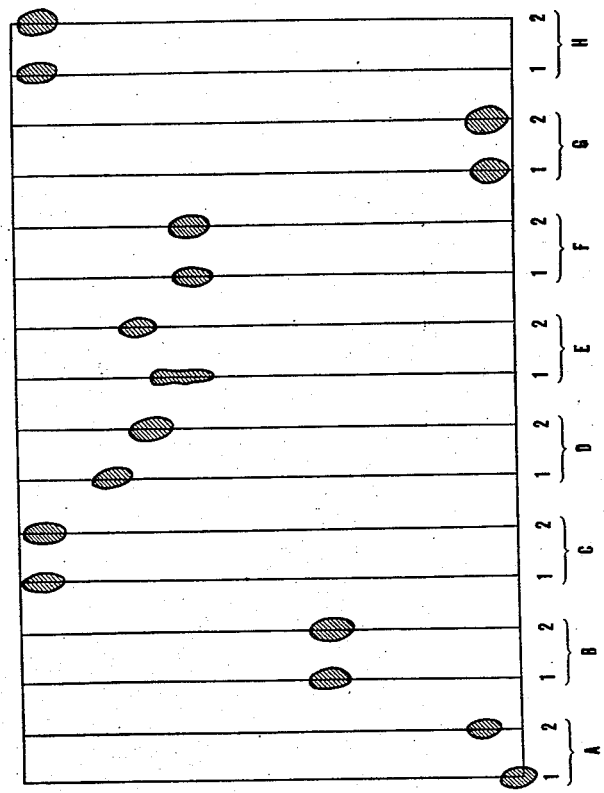

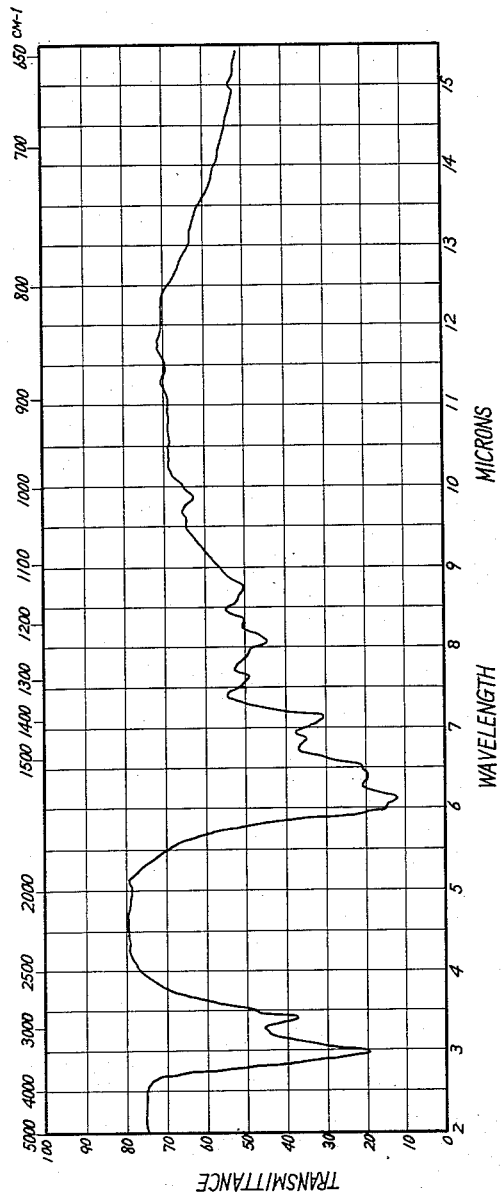

3,160,561
GLUMAMYCIN AND PRODUCTION THEREOF
Motoo Shibata, Toyonaka, Koiti Nakazawa, Amagasaki, Michitaka Inoue, Osaka, Hiromu Hitomi, Ibaraki, Komei Mizuno, Osaka, Masahiko Fujino and Akira Miyake, Nishinomiya, and Toyoshige Araki, Toyonaka, Japan, assignors to Takeda Chemical Industries, Ltd., Osaka, Japan
Filed Dec. 8, 1961, Ser. No. 159,817
Claims priority, application Japan, July 21, 1959, 34/23,709; Oct. 11, 1961, 36/36,851
11 Claims. (Cl. 167—65)

This application is a continuation-in-part of copending application, Serial No. 43,352, filed July 18, 1960, now abandoned.

This invention relates to a new antibiotic—glumamycin—and to its production by fermentation of appropriate microorganisms.

It has been found by the present inventors,
(1) That there exist microorganisms capable of producing the new antibiotic;
(2) That the microorganisms capable of producing the antibiotic belong to a species of the genus Streptomyces;
(3) That the antibiotic is accumulated when the microorganisms are incubated aerobically;
(4) That the so-accumulated antibiotic can be recovered in a desired purity from the incubation broth, utilizing the physico-chemical properties of the antibiotic; and
(5) That the antibiotic has strong antibacterial activity against pathogenic Gram-positive bacteria.

The new antibiotic has been named "Glumamycin."

Broadly speaking, the strains which can be used in the method of the present invention belong to the genus Streptomyces and are capable of producing glumamycin. Thus, for example, the microorganism designated as Strain No. 7548, which has been isolated by the present inventors from soil in Mishima district, Osaka, Japan, and which shows the following microbial characteristics, or a similar strain, or their mutants or variants, may advantageous be employed in the present invention.

A. Morphological characteristics:
  Aerial mycelium—Straight spore-bearing hyphae, occasionally bloom-shaped.
  Conidia—1.2–1.8μ x 1.0–0.8μ.
B. Characteristics of the cultures: In these characteristics, the color names designated "Rdg." are based on Ridgway's Color Standard and Nomenclature.
  (1) Glucose Czapek's agar—
    Growth: Cream-colored, folded.
    Aerial mycelium: White to Smoke Gray (Rdg. XLVI–21'''', d).
    Soluble pigment: Cream-color (Rdg. XVI–19', f).
  (2) Glycerin Czapek's agar—
    Growth: Cream-colored, folded, thick.
    Aerial mycelium: White, later Light Grayish Olive (Rdg. XLVI–21'''', b).
    Soluble pigment: Cream color (Rdg. XVI–19', f) to Light Green-Yellow (Rdg. V–29, d).
  (3) Czapek's agar—
    Growth: Thin, folded.
    Aerial mycelium: None, or scant, White.
    Soluble pigment: None.
  (4) Yeast-extract agar—
    Growth: Brownish, wrinkled.
    Aerial mycelium: Scant, White to Smoke. Gray (Rdg. XVI–21'''', d).
    Soluble pigment: Brown.
  (5) Gelatin—Liquefaction, slowly.
  (6) Starch agar—
    Growth: Colorless, penetrating deep into medium.
    Aerial mycelium: White.
    Soluble pigment: None.
  (7) Calcium malate agar—
    Growth: Colorless, lichenoid.
    Aerial mycelium: White.
    Soluble pigment: None.
  (8) Tyrosinate agar—
    Growth: Colorless, thin.
    Aerial mycelium: None.
    Soluble pigment: None.
  (9) Potato plug—
    Growth: Cream-colored.
    Aerial mycelium: White to Smoke Gray (Rdg. XLVI–21'''', d).
    Soluble pigment: Brownish black around the growth.
  (10) Carrot plug—
    Growth: Colorless colonies.
    Aerial mycelium: None or scant, Smoke Gray (Rdg. XLVI–21'''', d).
    Solube pigment: No pigmentation.
  (11) Milk—
    Growth: Brownish, ring.
    Milk: Peptonization slowly, no coagulation.
  (12) Egg—
    Growth: Dark brown around the growth.
    Aerial mycelium: Light Grayish Olive (Rdg. XLVI–21'''', b).
  (13) Glucose asparagine agar—
    Growth: Colorless.
    Aerial mycelium: White, with Tilleul-Buff (Rdg. XL–17''', f) spots.
    Soluble pigment: None.
    Reverse: Cream Color.
  (14) Nutrient agar—
    Growth: Colorless.
    Aerial mycelium: White.
    Soluble pigment: Faint brown.
  (15) Glycerin nutrient agar—
    Growth: Colorless, wrinkled.
    Aerial mycelium: Scant, White.
    Soluble pigment: Brown.
  (16) Glucose nutrient agar—
    Growth: Colorless to Light Buff (Rdg. XV–17', f).
    Aerial mycelium: Scant, White.
    Soluble pigment: Brown.
  (17) Nitrate reduction—Reduction.
  (18) Cellulose—No growth.
  (19) Starch plate—Hydrolysis, 32 mm./12 mm.
C. Utilization of carbon sources observed by Pridham's method:

| | | | |
|---|---|---|---|
| D-Glucose | + | D-Xylose | + |
| Rhamnose | + | L-Arabinose | + |
| D-Fructose | − | D-Galactose | + |
| Saccharose | − | Maltose | + |
| Lactose | + | Raffinose | − |
| Inuline | − | D-Manitol | − |
| D-Sorbitol | − | Dulcitol | − |
| Inositol | − | Salicin | + |
| Sodium acetate | + | Sodium citrate | + |
| Sodium succinate | + | Control | − |

Remarks: +—Growth. −—No growth.

As seen in the above-mentioned fungal characteristics referring to Bergey's Manual of Determinative Bacteriology, the 7th edition (1957), Strain No. 7548 is mesophilic, produces a brown to pale brown soluble pigment on organic media, and its aerial mycelium is gray and has straight sporophore, so that Strain No. 7548 appears to have relatively close resemblance to *Streptomyces tana-*

*shiensis*. However, Strain No. 7548 has straight or bloom-shaped aerial mycelium, forms brownish rings on milk and reduces nitrates, contrary to *Streptomyces tanashiensis* which has almost straight hyphae and slightly open spirals, forms yellowish rings on milk and does not reduce nitrates. The antibiotic, glumamycin, which is produced by Strain No. 7548, appears to resemble amphomycin and zaomycin which are known antibiotics. However, Strain No. 7548 differs from the amphomycin-producing-strain in that it has no spiral and a few different cultural characteristics of growth on various culture media. There is no difference in morphological characteristics between Strain No. 7548 and *Streptomyces zaomyceticus* which produces zaomycin, and the former appears to coincide on the whole with the latter in cultural characteristics of growth on culture media, except that the former lacks abilities of coagulating milk and producing a golden yellow soluble pigment.

The above-mentioned characteristics of Strain No. 7548 and the differences observed between the strain and *Streptomyces zaomyceticus,* indicate that the former is a variant of the latter.

It can, of course, be said that characteristics on culture media of the microorganisms belonging to actinomycetes, especially to the genus Streptomyces are not fixed nor unchangeable, and the glumamycin-producing strains are no exception. For example, a glumamycin producing strain such as Strain No. 7548 may change its appearance on culture media as the result of natural or artificial variation of mutation induced for example by irradiation with X-ray or ultraviolet-ray or by action of a chemical reagent. Hence, it is a matter of course that the variants or the mutants of Strain No. 7548 can be employed in the method of the present invention so long as they retain the ability to produce glumamycin.

In the method of the present invention, a glumamycin-producing strain belonging to the genus Streptomyces is incubated on or in an aqueous medium containing assimilable carbon sources and digestible nitrogen sources. As the carbon sources, starch, glucose, lactose, maltose, etc. may be employed. As the nitrogen sources, peptone, meat extracts, wheat bran, rice bran, soybean powder, cornsteep liquor, casein, yeast, amino acids, ammonium salts, urea, etc. may be employed. Further, a small quantity of usual inorganic salts, such as sodium chloride, phosphates, salts of calcium, zinc, manganese, magnesium, etc., and/or growth accelerators may be added to the medium. And, if desired, other conventional nutrient factors or precursors may be added. The incubation medium may be liquid or solid but, generally speaking, a liquid medium is more suitable for industrial purposes, and submerged culture is preferred.

When the incubation is conducted under aerobic submerged conditions, it is preferably conducted at a temperature of about 25° to 35° C. over a period of 2 to 5 days, and the medium may be adjusted to pH 6 to 8, but these conditions, of course, may be selected in accordance with the other conditions or with the specific characters of the microorganism used. Most preferably, the pH of the medium may be around neutral, temperature may be about 28° to 30° C., and the incubation period may be 2 to 5 days. The incubation conditions, however, are not definitive ones, and they should be selected, or adjusted so as to secure the most preferable results.

Glumamycin is produced and accumulated in the medium when a glumamycin-producing strain is incubated in the manner mentioned above.

Glumamycin belongs to the peptide-type antibiotics. Peptide-type antibiotics can be divided into two groups; one comprises those consisting of only amino acids and the other those consisting of amino acids and other constituents. Glumamycin, which is in acidic substance, belongs to the latter class in which peptide-type antibiotics such as actinomycin, ethiomycin, etamycin, etc. produced by the microorganisms of actinomycetes are included.

Glumamycin can be transferred from its water solution into an alcohol such as normal-butanol, secondary butanol, iso-amyl alcohol, etc. at an acidic pH, and can be returned to water at neutral or an alkaline pH. Glumamycin can be separated from the broth by shaking with such an alcohol as exemplified above at pH about 2 to 4, and transferred into water at pH about 7 to 9.

Since glumamycin is a fairly high-molecular compound, it can be purified by the means which are generally utilized for separating a high-molecular compound from impurities. For example, glumamycin is precipitated from its aqueous solution by saturation with such an inorganic salt as ammonium sulfate. As glumamycin precipitates also from its aqueous solution at its isoelectric point, it can be separated from its aqueous solution by adjusting the pH of the solution to about 3.0 to 3.5, which is its isoelectric point. As glumamycin is impermeable through a semi-permeable membrance, such as cellophane and bladder bag, it can be separated from low-molecular impurities by dialysis in running water using such a semi-permeable membrance. Electrolytic dialysis employing ion-exchange membranes can also be employed for eliminating the ions of inorganic impurities from a crude glumamycin solution. Glumamycin can be effectively separated from its impurities such as colored substances by means of adsorption chromatography wherein difference between glumamycin and the impurities in adsorbability on adsorbents is utilized. In this treatment, silicates and active carbon, etc., can be used as adsorbents, and alcohols, for example, butanol, ethanol, methanol, etc., can be effectively employed for eluting out the objective material on the adsorbents. These alcohols are especially suitable for the elution when they contain a little water.

Ionized impurities existing in a crude glumamycin or in an aqueous solution containing glumamycin may be removed by the use of ion-exchangers. The aqueous solution containing glumamycin and the impurities is brought into contact with an acid ion-exchanger and a basic ion-exchanger, namely, the solution is allowed to flow through a tower or a layer of each of the ion-exchangers, or is stirred together with the ion-exchangers. For this purpose, it may be desirable that the ion-exchangers are of comparatively large particles (about 40 to 100 mesh) and have rather strong adsorbability. Ion-exchangers now on the market which are suitable for this invention are cubic resins of weakly acid type belonging to the carboxylic acid series, such as "Amberlite IRC–50," and cubic resins of strongly basic type belonging to the quaternary ammonium series, such as "Amberlite IR–400" (Rohm & Haas Co., U.S.A.).

Glumamycin can be precipitated from its aqueous solution as an adduct compound by addition of a heavy metal salt, such as lead acetate. Hence, it may be separated from impurities by taking advantage of this property, namely, by adding an aqueous solution of such a heavy metal salt to an aqueous solution of glumamycin to precipitate the salt of glumamycin, and then by removing the heavy metal from the salt to give fairly pure glumamycin. More particularly, the precipitate of the heavy metal salt of glumamycin is washed with water and then suspended in water, hydrogen sulfide is introduced into the suspension to precipitate the heavy metal, the precipitate is collected by filtration and washed with water or an aqueous solution of such a weak alkali as sodium hydrogen carbonate, and then, from the washing and the filtrate, glumamycin is extracted at an acidic pH, more desirably at pH 2–3, with an organic solvent, such as normal-butanol, secondary butanol, etc.

Figure 2:
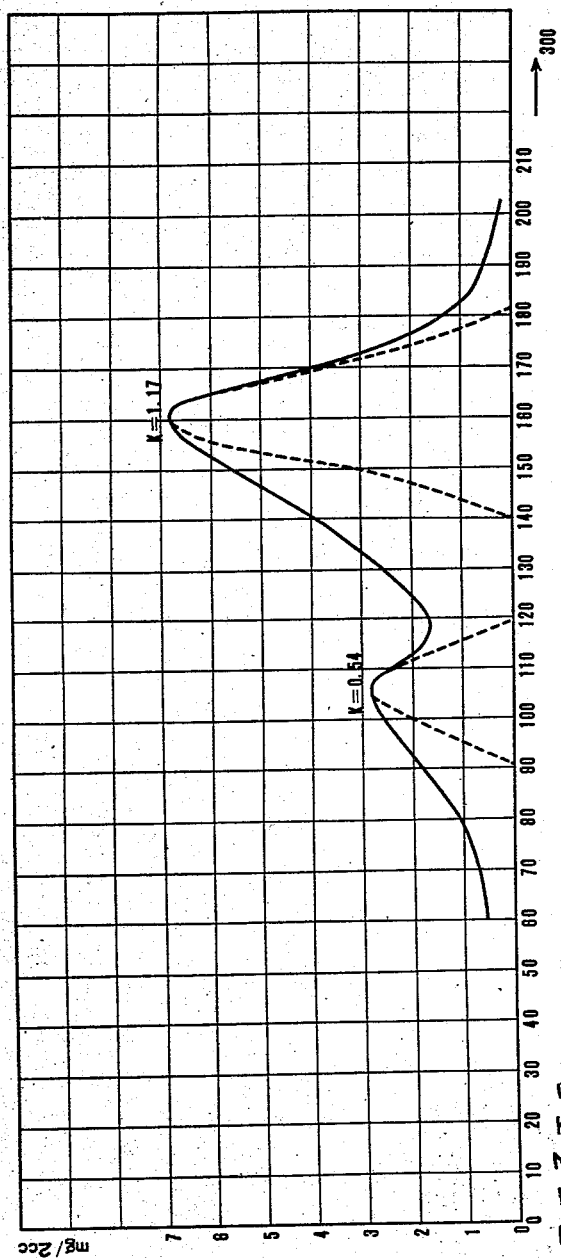

The pale yellow powder of glumamycin thus obtained still contains some impurities. This powder can be purified, for example, by means of counter-current-distribution effectively, especially by distributing it between two layers formed by adding water, a diluted mineral acid or a buffer solution to a mixture of a solvent immiscible with water, such as normal-butanol, secondary butanol, ethyl acetate, benzene, chloroform, etc., and a solvent freely miscible with water and able to dissolve glumamycin such as methanol, ethanol, etc. More concretely, such a solvent system as chloroform:methanol:1/50 N-hydrochloric acid (2:2:1), secondary butanol:ethyl acetate: methanol: 1/50 N-hydrochloric acid (2:8:3:7), etc., is favorable to distribute the crude glumamycin. The glumamycin thus obtained from the fraction showing the theoretical curve is almost pure. FIG. 2 of the accompanying drawing is an example of a counter-current-distribution diagram of glumamycin brought about my submitting 5 grams of glumamycin to a counter current distribution of 300 steps and using the upper and lower layers of a solvent system consisting of chloroform, methanol and 1/50 N-hydrochloric acid in the ratio of 2:2:1 by volume.

Glumamycin, thus isolated, is a colorless crystalline powder and is an acidic peptide which has isoelectric point at pH about 3.0 to 3.5, and both the free acid and its sodium salt are somewhat positive to ninhydrin-reaction, and negative to Sakaguchi's reaction and Molisch's reaction.

Glumamycin decomposes at 230° C., and has maximum absorptions at the wavelengths of 3.0, 3.4, 5.7, 6.0, 6.5, 6.9, 7.2 and 8.2μ. The infrared spectrum (in potassium bromide disk) is shown in FIG. 1. By a measurement of specific rotation, glumamycin thus obtained shows $$[\alpha]_D^{20} = +8.0 \pm 0.5°$$

(c.=2%, in ethanol). Glumamycin consists of carbon, hydrogen, oxygen and nitrogen atoms. A result of elementary analysis was C, 53.25%; H, 7.20%; N, 14.07%. Glumamycin is not easily soluble in water, but is easily soluble in alkaline water, lower alcohols, such as methanol, ethanol, etc., and such alcohols are normal-butanol, iso-amylalcohol, etc., when they contain water; sparingly soluble in acetone; and insoluble in alkyl acetates, chloroform, ethyl ether, petroleum ether, etc.

To a portion of glumamycin is added 20 times the weight of 6-normal aqueous hydrochloric acid, and the mixture is heated at 110° C. for 24 hours to separate out an oily material, which is extracted with ether. The extracted oily material is an acidic substance having a characteristic odor and boiling at 139° C./1 mm. Hg. Its elementary analytical value is C, 73.59%; H, 11.39%. The oily material is treated with S-benzylthiuronium chloride to give its S-benzylthiuronium salt as colorless plates melting at 131° C. The elementary analytical value of this S-benzylthiuronium salt is C, 66.37/; H, 8.94°; N, 7.13%; S, 8.61% and shows good accordance with the formula $C_{21}H_{34}N_2SO_2$; on this basis the oily material is an unsaturated aliphatic acid having a double bond and the empirical formula $C_{13}H_{24}O_2$. The unsaturated acid is subjected to ozone oxidation to give malonic acid and a saturated fatty acid having the empirical formula $C_{10}H_{20}O_2$ and also being optically active. The unsaturated $C_{13}$-fatty acid thus corresponds to 3-isotridecenoic acid, showing an elementary analytical value of C, 53.25%; H, 7.20%; N, 14.07%. On paper chromatogram of the aqueous layer, there were detected seven ninhydrin-positive spots, which were identified respectively as those corresponding to L-aspartic acid, L-threo-β-methylaspartic acid, L-valine, L-proline, glycine, D-pipecolic acid and D-erythro-α,β-diaminobutyric acid. β-Methylaspartic acid was isolated as crystals melting at 254–256° C. D-erythro-α,β-diaminobutyric acid was also isolated as the hydrochloride melting at 202° C. with decomposition, and it was oxidized with hydrogen peroxide to give D-alanine, and also it gave D-threonine and D-allothreonine by partial deamination with nitrous acid.

The seven ninhydrin-positive components were quantitatively analyzed in accordance with both methods contributed by S. Moore and W. H. Stein in Journal of Biological Chemistry, vol. 192, page 663 (1951), and by A. L. Levey in Nature, vol. 174, page 126 (1956), to find that the molar ratio of respective components is 4 moles of the sum of aspartic acid and methylaspartic acid, 2 moles of glycine, 1 mole each of valine, proline and pipecolic acid, and 2 moles of α,β-diaminobutyric acid. On the same equivalent basis, the content of the said $C_{13}$-fatty acid was calculated as 1 mole from its yield. While, molecular weight of glumamycin measured in accordance with the method contributed by Batters et al. and Schröder in J. Am. Chem. Soc., vol. 73, page 1887 (1951) and ibid, vol. 74, page 5118 (1952), respectively, was found to be about 1,350. As a summary of the above-disclosed facts, it is concluded that the molecular formula of glumamycin is $C_{58}H_{99}O_{20}N_{13}$, for which it is calculated that the elemental percentages are C, 53.6%; H, 7.6%, and N, 14.0%.

As a result of investigation as to N-terminus of glumamycin by DNP (=dinitrophenyl) technic contributed by F. Sanger in Biochemical Journal, vol. 39, page 507 (1945), it was revealed that only the β-amino group of one of the two α,β-diaminobutyric acid portions is liberated. On the other hand, C-terminus, i.e., C-terminal amino acid was not detectable by hydrazinolysis technic contributed by S. Akabori et al. in Bulletin of Chemical Society, Japan, vol. 25, page 214 (1952). Glumamycin can be partially hydrolyzed with hydrochloric acid to give 3-isotridecenoyl aspartic acid.

In view of the above-mentioned findings, glumamycin is regarded as an acidic polypeptide having a cyclic structure on one hand, and having 3-isotridecenoyl aspartic acid moiety constituting a terminus.

Glumamycin is an acidic antibiotic as mentioned above, so that it is capable of forming salts with a variety of basic substances such as sodium, potassium magnesium, calcium, ammonia, or the like. Among these salts, calcium salt of glumamycin is particularly stable and it can easily be purified. Preparation of the calcium salt is usually carried out by allowing free glumamycin or its alkali metal salt to react with an appropriate calcium ion donor, for example, such a calcium salt as hydroxide, nitrate, chloride, bromide, iodide, carbonate, borate, acetate, formate, propionate, lactate, cinnamate, gluconate, benzoate, phthalate, or the like, which are more or less soluble in a polar solvent such as water or alcohols and are dissociated in the solvent to give calcium ion. In such a solvent as water, methanol, ethanol, propanol, isopropanol, butanol, isobutanol, or the mixture of more than two kinds of them, the salt formation is smoothly carried out.

Calcium salt of glumamycin retains the same degree of antimicrobial activity as molar equivalent of free glumamycin, and the remarkable activity is kept during a longer period than in the case of the latter or alkali metal salts thereof because of the remarkable stability of the calcium salt as shown in the next table of a result of experiments on stabilities of them.

Aqueous solutions of sodium salt and calcium salt of glumamycin were respectively prepared so as to be made their antimicrobial activities equal to each other. The test solutions were then allowed to stand at 37° C. Observation was carried out by measuring respective antimicrobial activities of these test solutions by cup-method at the indicated time, respectively.

| After the Preparation (days) | Sodium salt of glumamycin, u./cc. | Calcium salt of glumamycin, u./cc. |
|---|---|---|
| At the preparation | 4,980 | 4,980 |
| 3 | 4,935 | 4,920 |
| 5 | 4,910 | 4,910 |
| 7 | 4,435 | 4,905 |
| 10 | 4,280 | 4,510 |
| 14 | 3,355 | 4,400 |
| 30 | 2,235 | 3,772 |

Calcium salt of glumamycin is particularly suitable for topical use for combating pathogenic Gram-positive bacteria because of the remarkable activity, less toxicity and the stability thereof. Preparation of calcium salt of glumamycin also provides desirable means for purification of glumamycin, in other words, glumamycin is advantageously purified through the form of its calcium salt.

At the salt formation, there may be obtained a double salt of glumamycin such as glumamycin calcium chloride, glumamycin calcium iodide, or the like according to the kind of the calcium ion donor, the solvent, or other conditions. However, as the double salt is so active and stable as the pure calcium salt, it may of course be employed for the same object as the latter.

Antibacterial spectrum of Streptomyces zaomyceticus No. 7548 on media such as bouillon-agar, glycerin-agar by the cross-streak method shows that the microorganism is active against Gram-positive bacteria. A test for antimicrobial activities on discs of bouillon-agar and glycerin-bouillon-agar cultures at pH 6.0 and 8.0 shows that the strain exhibits more effective activity at the latter pH than at the former.

From the above-mentioned findings, glumamycin is shown to be a physiologically basic substance active mainly against Gram-positive bacteria.

In the following Table I, the antimicrobial spectrum of glumamycin against each bacterium is shown in terms of the width in millimeters of the growth-inhibitory zone on the cultures.

TABLE I

| Bacteria \ Culture | Bouillon-agar | | Glycerin-bouillon-agar | |
|---|---|---|---|---|
| Escherichia coli | 0 | 0 | 0 | 0 |
| Proteus vulgaris | 0 | 0 | 0 | 0 |
| Staphylococcus aureus | 0 | 0 | 14 | 15 |
| Bacillus cereus | 22 | 20 | 25 | 26 |
| Bacillus subtilis | 0 | 0 | 23 | 23 |
| Pseudomonas aeruginosa | 9 | 10 | | |
| Serratia marcescens | 0 | 0 | | |
| Mycobacterium ATCC-607 | | | 0 | 0 |
| Mycobacterium avium | | | 0 | 0 |

Antimicrobial spectrum of glumamycin is shown in the following Table II, from which it is observed that glumamycin inhibits the growth of Gram-positive bacteria, but hardly inhibits the growth of Gram-negative bacteria, acid fast bacteria, fungi and yeasts.

TABLE II

| Bacterium | Minimum concentration for inhibiting the growth (mcg./ml.) |
|---|---|
| Escherichia coli | >100 |
| Proteus vulgaris | >100 |
| Staphylococcus aureus 209P | 1.0 |
| Bacillus subtilis PCI 219 | 0.5 |
| Bacillus cereus | 1.0 |
| Micrococcus flavus | 0.5 |
| Mycobacterium avium (Streptomycin-resistant) | >100 |
| Mycobacterium 607 | >100 |
| Aspergillus niger | >100 |
| Penicillium notatum | >100 |
| Candida albicans | >100 |

Both free glumamycin and its magnesium salt show an activity of about 1,000 to 1,500 units per milligram against Staphylococcus aureus 209P by Waksman's dilution method.

Toxicity of glumamycin is $LD_{50}=500$ mg./kg. in mice by intraperitoneal injection.

From the properties of glumamycin mentioned above, it may be regarded as an antibiotic resembling the known antibiotics, amphomycin and zaomycin. The two known antibiotics are acidic peptide antibiotics, though their chemical structures have not yet been clarified. However, as the several differences shown below are clearly observed between glumamycin and the two known antibiotics, glumamycin is shown to be a novel antibiotic differing from any of the known antibiotics:

(1) The means of summarized paper chromatogram reported by Hinuma et al. (Journal of Antibiotics Series A, vol. 7, pp. 134–136) was applied to both glumamycin and zaomycin under the same conditions, and the results shown in FIG. 3 were obtained. In FIG. 3, the chromatograms of zaomycin are marked with 1 and those of glumamycin are marked with 2, and the capital letters from A to H stand for developers as follows:

A. Normal-butanol saturated with water;
B. 20% aqueous solution of ammonium chloride;
C. 50% aqueous solution of phenol;
D. 50% aqueous solution of acetone;
E. A mixture consisting of 40 parts by volume of normal-butanol, 10 parts by volume of methanol, 20 parts by volume of water and 1.5 parts by weight of methyl orange;
F. A mixture of normal-butanol, methanol and water in the ratio 4:1:2 by volume;
G. A mixture of benzene and methanol in the ratio 4:1 by volume;
H. Distilled water.

In the cases of developers A, B and D, differences between glumamycin and zaomycin are clearly observed.

(2) It has been reported that zaomycin is positive to ninhydrin reaction but amphomycin is negative to the reaction. Glumamycin is faintly colorized in ninhydrin-reaction only when the sample is pure. This fact provides a point in which glumamycin is differentiated from amphomycin.

(3) B. Heinemann et al. have reported (Antibiotics and Chemotherapy, vol. 3, p. 1239 (1953)) that the sodium salt of amphomycin reacts with calcium chloride in water to form the water insoluble calcium salt of amphomycin. However, glumamycin forms no water-insoluble calcium salt with calcium chloride.

(4) Giovanni Giolitti et al., after their study on a polypeptide type antibiotic produced by a strain belonging to the genus Streptomyces (Giornale di Microbiologia, vol. 3, pp. 79–80 (1957)), have reported that the antibiotic is regarded as amphomycin itself and that it consists of aspartic acid, glycine, valine, proline and an unknown amino acid. But, as aforementioned, glumamycin consists of L-aspartic acid, glycine, L-valine, L-proline, $\alpha(L),\beta$-methylaspartic acid. D-pipecolic acid, $\alpha,\beta$-diaminobutyric acid and 3-iso-tridecenoic acid, so that glumamycin differs clearly from the polypeptide-type antibiotic obtained by Giolitti et al.

From the results of the above comparison, it is obvious that glumamycin is a new antibiotic differing from any known acidic polypeptide-type antibiotic resembling glumamycin such as zaomycin and amphomycin.

Glumamycin has strong activity to inhibit the growth of Gram-positive bacteria as mentioned before. The following is a test of the activity of glumamycin in vivo using mice as the test animals and pneumococcus type-I as test microorganism.

The mice used weighed 16 to 19 grams. A fresh culture of pneumococcus was further incubated in glucose-bouillon for 8 hours at 37° C., and then the culture was diluted decimally with bouillon. The mice were injected intraperitoneally with 0.25 milliliter each of the culture diluted to the extent of $10^{-5}$ (0.25 milliliter of this dilution corresponding to 10,000 MLD). One hour later, glumamycin was injected into the mice subcutaneously, and observation was continued for a week. Heart blood of the mice which died during the week was incubated to confirm that the death was caused by pneumococcus type-I.

TABLE III

| Inoculum size | Injected amount of glumamycin (mg./mouse) | Number of survivors/ Number of used mice | Survival rate (Percent) |
|---|---|---|---|
| $10^{-5}$ | 0.8 | 5/5 | 100 |
|  | 0.4 | 4/5 | 80 |
|  | 0.2 | 0/5 | 0 |
|  | 0.1 | 0/5 | 0 |
|  | 0 | 0/5 | 0 |
| Control for confirming the activity of bacteria: |  |  |  |
| $10^{-6}$ | 0 | 0/3 | 0 |
| $10^{-7}$ | 0 | 0/3 | 0 |
| $10^{-8}$ | 0 | 0/3 | 0 |
| $10^{-9}$ | 0 | 1/3 | 33 |

The foregoing test shows that glumamycin has an effective antimicrobial activity in vivo.

Following are some examples of presently preferred embodiments of the invention. In the examples, units of the antimicrobial materials are dilution units measured by Waksman's dilution method using *Staphylococcus aureus* as test bacteria. Percentages are by weight.

Example 1

500 liters of a medium consisting of 5.0% of starch, 2.0% of rice bran, 0.5% of peptone, 0.1% of soybean oil, and water is sterilized by heating in a tank. Into the medium is inoculated a seed-culture of *Streptomyces zaomyceticus* No. 7548, and then incubated for 90 hours at 28° C. to produce glumamycin. The antimicrobial activity of the broth is about 350 units per milliter. The broth is filtered to give about 330 liters of filtrate, in which almost all the glumamycin produced is contained.

Cultures of *Streptomyces zaomyceticus* No. 7548 have been deposited in Institute for Fermentation, Osaka, and in the American Type Culture Collection, Washington, D.C., and assigned the culture numbers IFO-3856 and ATCC-13876, respectively.

Example 2

Into a medium prepared by adding 0.2% of calcium carbonate to starch-bouillon is inoculated *Streptomyces zaomyceticus* No. 7548, and then incubated for 6 days at 28° C. to accumulate glumamycin in the broth. The antimicrobial activity of the broth is 350 units per milliliter.

Example 3

Into a medium prepared by adding the quantities of dipotassium hydrogen phosphate shown below to an aqueous mixture consisting of 3.0% of starch, 2.0% of rice bran, 1.0% of peptone, 0.3% of soybean oil and water, is inoculated *Streptomyces zaomyceticus* No. 7548, and then incubated for 6 days at 28° C. to accumulate glumamycin in the broths. The correlation between the quantity of dipotassium hydrogen phosphate added and the antimicrobial activity of the broth is as follows:

| Quantity of $K_2HPO_4$, Percent | Antimicrobial activity (Units per milliliter) |
|---|---|
| 0 | 400 |
| 0.2 | 1,000 |
| 0.3 | 800 |
| 0.5 | 750 |

Example 4

Into an aqueous medium containing 5.0% of starch, 0.3% of ammonium chloride, 0.3% of ammonium sulfate, 0.2% of dipotassium hydrogen phosphate, 0.2% of sodium chloride, 1.0% of calcium carbonate, 0.2% of soybean oil, 0.05% of magnesium phosphate, 0.0005% of zinc sulfate, 0.001% of ferrous sulfate and 0.1% of glutamic acid, is inoculated *Streptomyces zaomyceticus* No. 7548, and then incubated for five days at 28° C. to accumulate glumamycin in the broth. The antimicrobial activity of the culture broth is 650 units per milliliter.

The same procedure as above except lack of glutamic acid results in that the antimicrobial activity of the culture broth is 350 units per milliliter.

Example 5

*Streptomyces zaomyceticus* No. 7548 is incubated as in Example 1. Through a filter-press precoated with 5 kilograms of a filter aid, 350 liters of the broth are filtered in the presence of 10 kilograms of filter aid to give 300 liters of filtrate. The filtrate is adjusted to pH 2.0 with hydrochloric acid, and extracted twice with 75 liters each of iso-amyl alcohol. The combined extract is washed with one-tenth its volume of water, and extracted first with 15 liters of 10% aqueous solution of sodium hydrogen carbonate, then twice with 4 liters each of 1% aqueous solution of sodium hydrogen carbonate. The combined extract is again adjusted to pH 2.0 with hydrochloric acid, and then extracted twice with 8 liters each of iso-amyl alcohol. The combined iso-amyl alcohol extract shows 7500 units per milliliter antimicrobial activity, which indicates that glumamycin has been almost quantitatively extracted from the broth.

Subsequently, the iso-amyl alcohol solution is extracted first with 2 liters of a saturated aqueous solution of sodium hydrogen carbonate and then twice with 1.2 liters each of 1% aqueous solution of sodium hydrogen carbonate, to give 5.5 liters of a blackish brown extract showing 35,000 units per milliliter antimicrobial activity.

Two liters of he extract thus obtained is adjusted to pH 2.0 and extracted twice with 300 milliliters each of normal-butanol. The extract is thoroughly washed with water to pH 2.8 to 3.0 and then allowed to flow through a tower, 5 centimeters in diameter and 10 to 15 centimeters in height, packed with carbon powder, at the rate of 2 to 3 milliliters per hour. The material adsorbed on the tower is eluted with normal-butanol. The colorless to pale yellow eluate positive to biuret-reaction is collected, concentrated under reduced pressure, and to the condensate is added ethyl acetate to separate out 32 grams of crude glumamycin as a pale yellow precipitate. The total potency of the blackish brown sodium hydrogen carbonate extract showing 35,000 units per milliliter is recovered to the extent of 60%.

Example 6

One liter of a blackish brown sodium hydrogen carbonate extract obtained as in the first half of Example 5 is adjusted to pH 2.0 with hydrochloric acid, and then extracted twice with 300 milliliters each of iso-amyl alcohol. The combined extract is washed free of chlorine ion with water. The washed extract is allowed to flow through a tower packed with about 700 milliliters of magnesium silicate (50–100 mesh) to adsorb colored substances, and is eluted subsequently with ethanol and methanol.

The pale yellow methanol eluate, in which is contained about 70 to 80% of the total potency of the starting extract, is concentrated under reduced pressure, and to the condensate is added ethyl acetate with stirring to obtain 10 grams of crude glumamycin as a white precipitate showing 750 to 1,000 units per milligram antimicrobial activity. The total potency of the starting extract is recovered to the extent of 30 to 40%.

Example 7

In 20 milliliters of methanol is dissolved 5 grams of crude pale yellow glumamycin obtained as in Example 5, and to the solution is added 40 milliliters of ethyl acetate. The mixture is concentrated under reduced pressure to separate out a white crystalline precipitate.

The precipitate is subsequently washed with ethyl acetate and acetone, and dried to give 3.5 grams of purified glumamycin as a white crystalline powder showing 1,000 to 1,500 units per milligrams antimicrobial activity. The total potency of the crude pale yellow glumamycin is recovered to the extent of 80%.

*Example 8*

One hundred milliliters of an iso-amyl alcohol extract (7500 units per milliliter) obtained as in the first half of Example 5 is shaken with 200 milliliters of water adjusted to pH 8.4–8.6 with sodium hydroxide to transfer the active substance into the aqueous phase. The aqueous layer is allowed to flow through 30 milliliters each of "Amberlite IRC–50" and "Amberlite IR–400." The effluent is further allowed to flow through "Amberlite IRC–50" to be adjusted to pH 6.0, and then concentrated under reduced pressure to about 10 milliliters. To the concentrate is added 50 milliliters of methanol, and the mixture is allowed to flow through a tower, 1.5 centimeters in diameter and 15 centimeters in height, packed with active carbon. Fractions active in bioassay are collected and concentrated under reduced pressure to give 150 milligrams of crude glumamycin as a pale yellow powder showing 750–1000 units per milligram. The total potency of the iso-amyl alcohol extract is recovered to the extent of 30%.

*Example 9*

To 500 milliliters of a blackish brown sodium hydrogen carbonate extract (cf. Example 5) is gradually added with stirring a saturated aqueous solution of lead acetate until no more precipitate separates out. The yellow precipitate is collected by centrifugation, washed well with water, and then suspended in 500 milliliters of water. Hydrogen sulfide is introduced in the suspension to precipitate lead ion as lead sulfide. Then the solution is adjusted to pH 9.0 with sodium hydroxide, and the resulting precipitate is separated by filtration and then washed with water of pH 9.0. The washings are combined with the filtrate, and the combined solution is adjusted to pH 2.0 with hydrochloric acid, and then extracted with normal-butanol to give a pale yellow solution of glumamycin in normal-butanol with the yield of 50–70% of the total potency of the starting extract.

*Example 10*

One hundred milliliters of a sodium hydrogen carbonate extract (7500 units per milliliter) obtained as in the first half of Example 5 is saturated with ammonium sulfate to precipitate a resinous substance. The precipitate is collected by filtration and submitted to dialysis through cellophane membrane in running water. The resulting solution is concentrated under reduced pressure to give 1 gram of crude glumamycin as a brown powder showing an activity of 500 units per milligram. The total potency of the starting extract is recovered to the extent of 66%.

*Example 11*

1.5 grams of crude glumamycin (750 units per milligram), obtained as in Example 5, is subjected to counter current distribution of 30 steps, using 10 milliliters each of upper and lower layers of the solvent-system consisting of 2 parts by volume of methanol and 2 parts by volume of water. As the result of determination on each step, the maximum value is observed at the 20th step, from which 190 milligrams of purified glumamycin are obtained as an amorphous white powder showing an activity of 750 units per milligram. The total potency of the starting crude material is recovered to the extent of 40%.

*Example 12*

To 20 milliliters of a blackish brown iso-amyl alcohol extract (35,000 units per milliliter) obtained as in the first half of Example 5, is added 0.2 gram of active carbon, and the mixture is filtered with stirring. To the so-obtained brown filtrate is added 5 milliliters of water, and to the mixture is added sodium hydrogen carbonate with stirring until the pH of the mixture becomes 7.0. The aqueous layer is separated from the solvent layer, and the solvent layer is washed with 5 milliliters of water. The washing is combined with the above aqueous layer, and the combined solution is adjusted to pH 3.2–3.4 with hydrochloric acid to precipitate a brown substance.

The upper solution is decanted off, and the remainder is dried under reduced pressure to give 0.9 gram of crude glumamycin as a brown powder having 350 units per milligram antimicrobial activity. The total potency of the starting iso-amyl alcohol extract is recovered to the extent of 40%.

*Example 13*

To 20 milliliters of a blackish brown isoamyl alcohol extract (35,000 units per milliliter) obtained as in the first half of Example 5, is added 0.2 gram of active carbon, and the mixture is filtered with stirring. To the so-obtained brown filtrate are added 5 milliliters of water, and to the mixture is added with stirring sodium hydrogen carbonate until the pH of the mixture becomes 7.0. The aqueous layer is separated from the solvent layer and the solvent layer is washed with a small quantity of water.

The washing is combined with the above aqueous layer, and the combined aqueous solution is submitted to dialysis through cellophane membrane in running water. By the dialysis, low-molecular dialysable substances are removed and high-molecular substances such as peptides precipitate. The resulting mixture is mixed with a small quantity of water, and adjusted to pH 2.0 with hydrochloric acid to dissolve the precipitate. The resulting solution is subject to freeze-drying to give 0.5 grams of crude glumamycin as a brown powder showing an activity of 750 units per milligram. The total potency of the starting extract is recovered to the extent of 50%.

*Example 14*

Filtrate of fermentation broth obtained by incubating *Streptomyces zaomyceticus* No. 7548 in a culture medium is treated with normal-butanol at a pH of 2.5–3.0 to transfer glumamycin into normal-butanol phase, and glumamycin thus transferred into normal-butanol is extracted with water of pH 8.0. These treatments for extraction are repeated to make the antimicrobial activity of a brown normal-butanol solution about 50,000 to 150,000 units per milliliter, where is hardly observed loss of the total units of the antimicrobial activity. The brown normal-butanol solution is allowed to flow through a column packed with charcoal powder for chromatography, and the column is washed with normal-butanol to obtain a pale yellow normal-butanol solution of glumamycin. The pale yellow solution is adjusted to pH 6.5 and concentrated under reduced pressure at a temperature lower than 40° C. to make its antimicrobial activity about 100,000 units per milliliter.

To the concentrated solution is added dropwise water-saturated normal-butanol solution saturated with calcium chloride keeping the pH of the concentrate 6.5 until no more precipitate separated in the mixture. The mixture is thoroughly agitated, and then allowed to stand overnight in a cool place. White precipitate is collected by filtration or centrifugation, and washed three times with normal-butanol half saturated with water, three times with anhydrous normal-butanol, and twice with ethyl acetate, and then dried to give calcium salt of glumamycin as white amorphous powder.

In 1 liter of hot water is dissolved 80 grams of the white amorphous calcium salt. The solution is filtered to remove some insoluble impurities and the filtrate is lyophylized. The resulting residue is again dissolved in hot water-containing normal-butanol. The solution is filtered and the filtrate is allowed to stand at a cool place to separate out crystals of calcium salt of glumamycin, which is then collected and dried overnight with phosphoric anhydride at 70° C. to give white crystals of the product showing specific rotation $[\alpha]_D^{24}$: $-64°$ (c.=1.0%, in methanol).

In this example, instead of the concentrated normal-butanol solution of glumamycin, a solution of about 130 to 140 grams of glumamycin obtained in Example 13 in 1 liter of normal-butanol may be employed.

The infra-red spectrum of the product in potassium disk is shown as FIGURE 4, from which it is readable that the product has maximum absorptions at the wave lengths of 2.92 (s.), 3.27 (m.), 3.40 (m.), 6.08 (vs.), 6.38 (s.), 6.88 (m.), 7.10 (m.), 7.58 (w.), 8.09 (w.) and 9.85 (w.), where bracketed signs (vs.), (s.), (sh.), (m.) and (w.) show that the absorptions are very strong, strong, shoulder, moderate and weak, respectively. The infra-red spectrum in FIGURE 4 was compared with that of free glumamycin shown as FIGURE 1. An absorption band observed in FIGURE 1 in wave length of about 5.7 microns, which is based on the presence of carboxyl group —COOH, has disappeared in FIGURE 4, and, in place, there is observed to have appeared the other absorption band in the wave length of about 6.3–6.4 microns based on the presence of carboxyl ion —COO−. From the fact, it was proved that the product is in the form of a salt.

*Example 15*

This example exemplifies the usefulness of the novel products according to the present invention in vitro in combating pathogenic Gram-positive bacteria.

Staphylococci are pyogenic or pus-forming bacteria. Typically they tend to produce circumscribed lesions, e.g., in the form of abscesses and the like, which often occur in the skin. Staphylococci are the cause of furuncles and of carbuncles and other common wound infections. The new products of the invention are useful in topical preparations for the treatment of this type of infection. Thus, a useful preparation for topical application to an infection due to *Staphylococcus aureus* is as follows:

Into 100 milligrams of wool fat is uniformly incorporated 5 milligrams of calcium salt of glumamycin and the mixture is then admixed uniformly with sufficient white petrolatum to make 1 gram of ointment.

Due to the disclosed bactericidal and bacteriostatic properties of the new products of the invention, these are also useful in vitro as antiseptics and disinfectants, e.g., to disinfect hospital apparatus, etc. which has been exposed to pathogenic Gram-positive bacteria of the type which are sensitive to such products, as aforementioned.

Having thus disclosed the invention, what is claimed is:

1. An acidic peptide antibiotic having growth-inhibiting action against Gram-positive bacteria and being characterized by the following further properties:
   (a) it is optically active;
   (b) it is a colorless crystalline powder decomposing at 230° C.;
   (c) its I.R. spectrum shows maximum absorptions at wave lengths of 3.0, 3.4, 5.7, 6.0, 6.5, 6.9, 7.2 and 8.2 microns;
   (d) its specific rotation $[\alpha]_D^{20}$=+8.0±0.5° (c.=2%, in ethanol);
   (e) it gives by hydrolysis one mole of 3-isotridecenoic acid, four moles of the sum of L-aspartic acid and L-threo-β-methyl-aspartic acid, two moles each of glycine and D-erythro-α,β-diaminobutyric acid, and one mole each of L-valine, L-proline and D-pipecolic acid;
   (f) its molecular formula is $C_{58}H_{99}O_{20}N_{13}$;
   (g) it is not readily soluble in water, but is easily soluble in aqueous alkaline solution and in lower alkanoles, sparingly soluble in acetone, and is insoluble in alkyl acetates, chloroform, benzene, ethyl ether, petroleum ether;
   (h) it is negative to the Sakaguchi reaction and to the Molisch reaction.

2. Calcium salt of the acidic peptide antibiotic as claim in claim 1 and characterized by the following properties:
   (a) it is optically active; specific rotation is $$[\alpha]_D^{24}=-64°$$

(c.=1%, in methanol);
   (b) it is crystallizable to give white crystals;
   (c) it is not readily soluble in cold water but soluble in hot water, and the aqueous solution thereof once prepared can keep its concentration of 80 grams of the salt per liter of water even at room temperature; it is soluble in methanol, but not easily soluble in ethanol and in higher homologues;
   (d) it is negative to the Sakaguchi reaction and to the Molisch reaction;
   (e) its I.R. spectrum shows maximum absorptions at wave lengths of 2.9, 3.27, 3.4, 6.1, 6.38, 6.9, 7.1, 7.6, 8.1 and 9.85 microns.

3. A process for producing glumamycin, the product of claim 1, which comprises cultivating a strain of *Streptomyces zaomyceticus* No. 7548 (ATCC–13876) in an aqueous medium containing nutrient under aerobic conditions until substantial antibacterial activity is imparted to the resultant broth, and then recovering the so-produced glumamycin from the said broth.

4. The process claimed in claim 3, wherein the recovery of glumamycin is conducted by utilizing difference between glumamycin and impurities in solubility to various solvents.

5. The process claimed in claim 3, wherein the recovery of glumamycin is conducted by utilizing difference between glumamycin and the impurities in distribution coefficient between two solvent phases.

6. The process claimed in claim 3, wherein the recovery of glumamycin is conducted by means of adsorption chromatography.

7. The process claimed in claim 3, wherein the recovery of glumamycin is conducted by means of partition chromatography.

8. The process claimed in claim 3, wherein the recovery of glumamycin is conducted by means of counter current distribution.

9. The process claimed in claim 3, wherein the recovery of glumamycin is conducted by means of dialysis.

10. The process claimed in claim 3, wherein the recovery of glumamycin is conducted by means of salting out.

11. The process claimed in claim 3, wherein the recovery of glumamycin is conducted by adding a heavy metal salt soluble in water to an aqueous solution containing glumamycin to precipitate the corresponding addition compound of glumamycin, and then, liberating glumamycin from the addition compound.

No references cited.